(12) United States Patent
Guy et al.

(10) Patent No.: US 6,298,057 B1
(45) Date of Patent: *Oct. 2, 2001

(54) SYSTEM AND METHOD FOR RELIABILITY TRANSPORTING AURAL INFORMATION ACROSS A NETWORK

(75) Inventors: Kenneth R. Guy, Thousand Oaks; Jaswant R. Jain, Chatsworth; Ishwar V. Jasuja, Simi Valley; Michael W. Johnson; Albert Juandy, both of Petaluma; Simon S. Lam, Agoura Hills; Anthony Y. Lee, Northridge; David Misunas, Thousand Oaks; Jacques A. Roth, San Rafael, all of CA (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/634,927

(22) Filed: Apr. 19, 1996

(51) Int. Cl.[7] ............... H04L 12/28; H04J 3/16; G06F 11/00

(52) U.S. Cl. ............... 370/389; 370/466; 370/474; 714/746

(58) Field of Search ............... 370/359, 389, 370/401, 402, 403, 405, 419, 450, 466, 467, 473, 474, 477; 371/31, 30; 395/182.18; 348/466; 714/746, 747

(56) References Cited

U.S. PATENT DOCUMENTS

| | | | |
|---|---|---|---|
| 4,630,262 | * | 12/1986 | Callens et al. ............... 370/435 |
| 4,726,019 | * | 2/1988 | Adelmann et al. ............... 370/474 |
| 4,866,704 | * | 9/1989 | Bergmann ............... 370/452 |
| 5,187,591 | | 2/1993 | Guy et al. . |
| 5,341,374 | * | 8/1994 | Lewen et al. ............... 370/450 |
| 5,359,598 | * | 10/1994 | Steagall et al. ............... 370/359 |
| 5,394,407 | | 2/1995 | Coddington ............... 371/37.1 |
| 5,426,652 | | 6/1995 | Heiman ............... 371/30 |
| 5,459,741 | | 10/1995 | Iwamura ............... 371/37.1 |
| 5,596,604 | | 1/1997 | Cioffi et al. ............... 345/260 |
| 5,636,231 | | 6/1997 | Huang et al. ............... 371/37.1 |
| 5,659,541 | * | 8/1997 | Chan ............... 370/236 |
| 5,699,485 | * | 12/1997 | Shoham ............... 395/2.32 |

OTHER PUBLICATIONS

Request for Comments (RFC) 2205, Resource ReSerVation Protocol—Version 1 Functional Specification, dated Sep. 1997.

\* cited by examiner

Primary Examiner—William Luther
(74) Attorney, Agent, or Firm—Trop, Pruner & Hu, P.C.

(57) ABSTRACT

A system and method for transparently transmitting aural signals across a wide area network (WAN). The system of present invention is connected to one or more of a private branch exchange, a key telephone system, a telephone, a facsimile machine, and a modem, for example. In the case of voice transmission, a user places a telephone call using the same procedure that is used when placing a telephone call over a conventional public switched network. The aural signals are translated into a format that is compatible with the local area network (LAN) and the translated signals are transmitted to a router or a switch that connects the LAN to the WAN. The data is transmitted across the WAN to a router or switch coupled to a second LAN. The data is then sent to a destination central site unit or PC which translates the signal into a format that is compatible with the telephone system connected thereto. The present invention provides a voice quality that approaches, equals, or exceeds the voice quality of conventional telephone switched networks. This high voice quality is achieved by utilizing a high quality voice digitization algorithm, by ensuring a low maximum network delay, by dynamically compensating for variations in network delay, and by using a forward error correction technique that can recreate lost or delayed signals in a manner that recreates the signal so the lost signal is typically not detectable by a user.

36 Claims, 9 Drawing Sheets

SYSTEM AND METHOD FOR RELIABILITY TRANSPORTING AURAL INFORMATION ACROSS A NETWORK

RELATED APPLICATIONS

This application is related to U.S. patent application Ser. No. 08/666,800 filed on Jun. 19, 1996 now U.S. Pat. No. 5,790,641 titled "System and Method for Improving Facsimile Delay Tolerances", to U.S. patent application Ser. No. 08/724,655, filed on Oct. 1, 1996 titled "System and Method for Transmitting Aural Information Between a Computer and Telephone Equipment", and to U.S. patent application Ser. No. 09/059,635 filed on Apr. 13, 1998 titled "System and Method for Improving Facsimile Delay Tolerances".

BACKGROUND OF THE INVENTION

1. Field of the Invention

The present invention relates generally to the field of telecommunications and more particularly to the field of transmitting aural information through a wide area network.

2. Description of Background Art

Conventional aural communication is accomplished using a public switched network, e.g., the telephone network. Through the use of such a public switched network users can easily communicate with each other by transmitting aural signals from a first terminal to a second terminal through the public switched network. The aural signals can represent voice data, modem data, or facsimile (fax) data, for example. In order to transmit voice data, a user performs a conventional procedure for setting up a call, and for tearing-down a call. In one example of a conventional call setup procedure, a user lifts a handset on a first telephone, listens for a dial-tone, and then enters a code identifying a destination telephone. A user at the destination telephone is notified that a connection is pending, e.g., by hearing the destination telephone ring, and the user lifts the handset. After the handset of the destination telephone is lifted, a connection between the first telephone and the destination telephone is established. As each user speaks, the sound is transformed and then transmitted through the telephone, through a private branch exchange (if any), through the public switched network, and then to the destination telephone where the transformed signal is re-transformed into an audible signal that can be heard by the user at the destination telephone.

Recently, communication systems have been developed that enable aural data to be transmitted over a wide area network (WAN). In these systems a private branch exchange (PBX) is connected to a communication device, e.g., a router, switch, FRAD, or multiplexor, that connects two networks having different data formats, e.g., a local area network (LAN) and a WAN. An example of a data format is a packet. A packet is a group of bits having a header portion and a data portion. The format of a packet can be different for each LAN and WAN. For example, the maximum size of a packet and packet destination and routing information can differ between networks. A router or a switch, hereafter referred to as a router, that also handles aural data converts a packet from a first format that is compatible with the PBX to a second format that is compatible with a WAN. After receiving the aural signals from the PBX, the router converts the aural signals into packets, transmits the packets across a WAN where they are received by a second router that is connected to a second PBX, key system or telephone. The second router converts the packets into aural signals and transmits the signals to the PBX, key system or telephone.

There are problems with connecting a source of aural information directly to a router. One problem is that the format of aural information and the format of information that can be received by the network router are typically incompatible and, in general, a specially developed router must be used to enable the PBX to transmit data through a WAN. A second problem is that routers are, typically, not capable of being inexpensively modified to receive telephony functionality, for example, it is difficult to add a circuit board having the required telephony functionality to a router. Accordingly, in order to add telephony compatibility and functionality to a WAN, a WAN user must replace the existing routers. This is an expensive solution. A third problem is routers that are compatible with a PBX or a KTS generally provide proprietary solutions that are not compatible with those of other routers. A fourth problem is that such solutions are not generally available in routers, thus limiting the options of a user.

Another technique for transmitting aural signals across a WAN is to connect a microphone and a speaker to a conventional personal computer (PC). A user loads and executes a software program that converts the received analog signal to a digital signal using the processor in the PC. The signal may be sent over a LAN to a router. The router transmits the signal over a WAN to a second router. The second router may transmit the signal over a second LAN, or directly, to a destination PC. If the destination PC is operating compatible software, the PC can convert the received signal back to an audible signal that is transmitted through the PC's speakers. While this technique is less expensive than the first technique, it also has limitations. One limitation is that such systems are currently incapable of providing a priority mechanism that would ensure that aural data arrives within a predetermined maximum time period. Most data currently transmitted through WANs are not time sensitive, i.e., a small delay in receiving data is acceptable if the data is accurate. However aural communication is time sensitive, i.e., it is generally more important for aural data to be received in a timely manner than it is for the data to be absolutely accurate. If, while a user is speaking into a microphone, another computer that is coupled to a router via the LAN requests a transfer of a large file, e.g., a computer aided design (CAD) file, the packets of voice data that are received by the first router after the first router begins transmitting the packets of the CAD file may incur a significant delay if the router transmits all of the packets of the CAD file before transmitting the aural packets. In this situation, the second user will experience a significant delay in the reception of aural signals.

A second limitation is that due to limitations on host processing capability, the quality of the received aural signal is significantly degraded when compared to the transmitted aural signal and cannot be characterized as a toll-quality or near-toll-quality signal. The public switched networks in the industrialized countries provide a toll-quality signal. A near-toll-quality-signal is within 0.5 point of the toll-quality signal as measured by the means-opinion-score (MOS) method, on a scale of five, as determined by listening tests. A signal that is 1.0 point below the toll-quality signal is generally characterized as a communications-quality signal. The MOS method is described in greater detail in *ITU-T Recommendation P.83, Subjective Performance Assessment of Telephone-Band and Wideband Digital CODECS*, (March 1993), that is incorporated by reference herein in its entirety.

A third limitation is that the software for converting an analog aural signal from the microphone into an aural packet that is compatible with the LAN requires significant computational power that is provided by the processor in the PC. As a result of this additional computational load on the processor, the processing capability of the computer that is available for processing other application programs, is significantly reduced.

A fourth limitation is that the call setup and conversation between two users is not transparent. That is, the quality of the received signal is not at a near-toll-quality standard, and the procedures used to initiate the connection and to maintain the connection are not conventional. Instead of lifting a handset, listening for a dial-tone, and entering a destination identifier on a telephone keypad, the user executes a software program, types a destination identifier using a computer keyboard and then talks into an external microphone and listens though speakers attached to the PC. Similarly, to receive the audible signals, the user must, for example, execute a software program, use a mouse to click on an "answer" button, and turn on the speakers. This lack of transparency requires users to re-learn how to communicate with a person at a remote location.

Accordingly, what is needed is a system and method: (1) for transmitting aural information as digital signals over a wide-area-data-network; (2) for transparently generating and receiving aural data; (3) that incorporates a robust error correction procedure that enables a receiver to recreate lost data; (4) that converts aural signals into a network compatible format, and that performs compression and decompression algorithms on the converted data without placing a significant computational load on a host processor; (5) that uses a router/switch priority system to minimize the end-to-end packet delay across a wide area network; (6) that adjusts the destination signal based upon packet delay variations; (7) that communicates with a router/switch over a standard LAN connection without requiring a specialized router/switch voice interface; and (8) that can connect to a LAN with a standard interface and can communicate over the LAN in standard data formats.

SUMMARY OF THE INVENTION

The invention is a system and method for transparently transmitting aural signals across a wide area network (WAN). The system of present invention is quickly and inexpensively installed in a server or a personal computer coupled to a local area network. The system is connected to one or more of a private branch exchange, a key telephone system, a telephone, a facsimile machine, and a modem. In the case of voice transmission, a user places a telephone call using the same procedure that is used when placing a telephone call over a conventional public switched network. The aural signals are translated into a format that is compatible with the local area network (LAN) and the translated signals are transmitted to a router or a switch that connects the LAN to the WAN. The data is transmitted across the WAN to a router or switch coupled to a second LAN. The data is then sent to a destination central site unit or PC which translates the signal into a format that is compatible with the telephone system connected thereto. The present invention provides a voice quality that approaches, equals, or exceeds the voice quality of conventional telephone switched networks. This high voice quality is achieved by utilizing a high quality voice digitization algorithm, by ensuring a low maximum network delay, by dynamically compensating for variations in network delay, and by using a forward error correction technique that can recreate lost or delayed signals in a manner that recreates the signal so the lost signal is typically not detectable by a user.

The benefits of the present invention include: (1) transmitting aural information as digital signals over a wide-area-data-network; (2) transparently generating and receiving aural data; (3) incorporating a robust error correction procedure that enables a receiver to recreate lost data; (4) converting aural signals into a network compatible format, and performing compression and decompression algorithms on the converted data without placing a significant computational load on a host processor; (5) utilizing a router/switch priority system to minimize the end-to-end packet delay across a wide area network; (6) adjusting the destination signal based upon packet delay variations; (7) communicating with a router/switch over a standard LAN connection without requiring a specialized router/switch voice interface; and (8) connecting to a LAN with a standard interface and communicating over the LAN in standard data formats.

DETAILED DESCRIPTION OF THE PREFERRED EMBODIMENT

A preferred embodiment of the present invention is now described with reference to the figures where like reference numbers indicate identical or functionally similar elements. Also in the figures, the left most digit of each reference number corresponds to the figure in which the reference number is first used.

Figure 1:
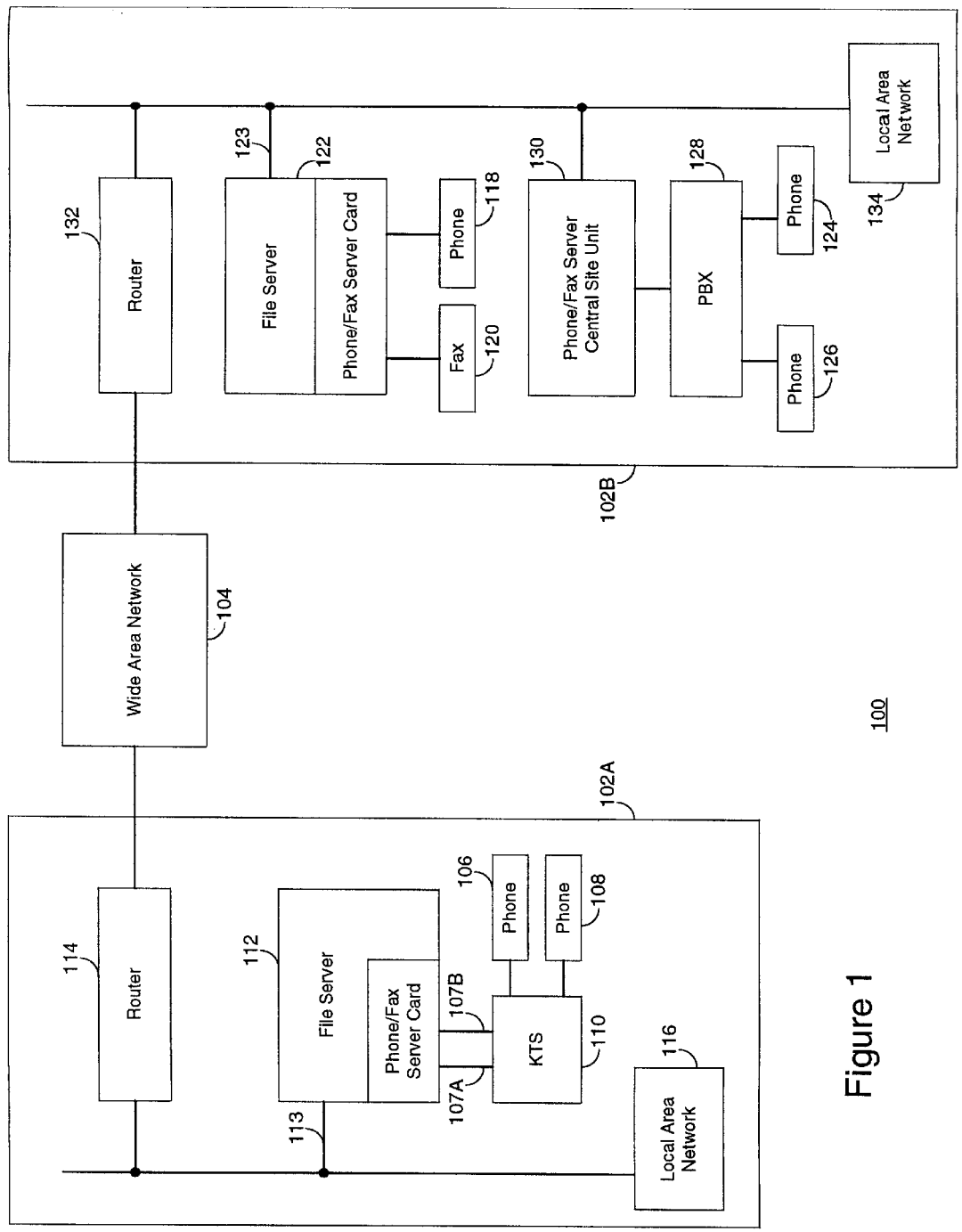
FIG. 1 is an illustration of a computer network environment in which the preferred embodiment of the present invention operates.

FIG. 1 is an illustration of a computer network environment in which the preferred embodiment of the present invention operates. FIG. 1 illustrates a first local configuration 102A coupled to a second local configuration 102B by a wide area network (WAN) 104. The first and second local configurations include a router 114, 132, file servers or personal computers (PCs) 112, 122, 130, and local area networks (LAN) 116, 134. Examples of LANs include an ethernet and a token ring network, an examples of a WAN include leased lines, frame relay, asynchronous transfer mode (ATM) networks, and the Internet. The present invention enables a user to transmit aural signals across a WAN using conventional telephones, facsimile machines (fax), and modems, i.e., in a transparent manner. It will be apparent to persons skilled in the relevant art that the present invention can operate on many different types of LANs and WANs without departing from the scope of the present invention. The first local configuration 102A includes two telephones 106, 108 coupled to a key telephone system (KTS) 110. In the present invention, the KTS 110 is coupled to a phone/fax server card (PFSC) located on a PC or a file server 112 via signal lines 107. In the preferred embodiment, the PFSC is located on a server. Accordingly, the description of the PFSC will be with respect to a file server. As described below, in an alternate embodiment, the PFSC is configured in a PC or other host processor system. The file server 112 and PFSC are described in greater detail below. The file server 112 is connected to the LAN via a network interface 113. The network interface 113 is coupled to the router 114 via the LAN 116. The router 114 receives data from devices in the first local configuration 102A, e.g., the file server 112. The data can be in the form of packets, as described below. The router transmits the packets from the local configuration 102A to the WAN 104 and then the packets are routed through the WAN 104 to a second router 132 in the second local configuration 102B. In an alternate embodiment of the present invention, a network switch or hub can be used in conjunction with, or in place of, the routers 114, 132.

The second local configuration 102B includes a second file server 122 having a phone/fax server card that is coupled directly to a telephone 118 and to a fax 120. The second LAN 102B is also coupled to a phone/fax server central site unit (CSU) 130. The CSU 130 is a PC that only performs operations related to the operation of the one or more phone/fax server cards located therein. The CSU 130 can contain multiple cards and is, generally, more reliable than either stand alone PCs or file servers because PCs and file servers typically also perform operations and run application programs not related to the PFSC. The CSU 130 is coupled to a conventional private branch exchange (PBX) 128 which in turn can be coupled to many telephones or faxes. In FIG. 1, two telephones 124, 126 are connected to the PBX 128. The second local configuration 102B includes a network interface 123 that is communicates through the LAN 134 to the router 132, the second file server 122, the CSU 130, and the remaining devices attached to the LAN 134. The second local configuration 102B is an example of a LAN connecting multiple devices, for example, each server 122, 130 can be connected to a hub in a different building.

The present invention is a system and method for enabling aural signals, e.g., voice signals, facsimile (fax) signals, and modem signals, to be transparently generated and transmitted to a phone/fax card located in a file server 112 coupled to a computer network or in a personal computer coupled to a first local configuration 102A. The file server 112 performs a setup operation to prepare a connection between two aural signal generation devices, e.g., between the first telephone 106 in the first local configuration 102A and the second telephone 126 in a second local configuration 102B. After setting up the connection, the PFSC in the file server 112 converts the received aural signals into digital signals and compresses the digital signals. Packets are generated from the compressed digital signals and these packets are transmitted to the router 114 via the LAN 116. The router transmits the packets across a wide area network (WAN), e.g., leased lines, frame relay, or the Internet, and the packets are received by the second router 132 in the second local configuration 102B. The second router 132 transmits the packets to the destination CSU 130. The destination CSU 130 converts the compressed digital signals in the packet into aural signals and transmits the aural information to the PBX 128 which transmits the signal to the second telephone 126. A more detailed description of the operation of the present invention is set forth below.

The present invention provides a cost-effective system and method for transmitting aural information from an aural signal generating device that is connected to a first local configuration 102A to an aural signal receiving device, e.g., the second telephone 126, connected to a second local configuration 102B, where the first local configuration 102A and the second local configuration 102B are both connected by a WAN 104. As described above, an aural signal generating device and an aural signal receiving device can be, for example, a telephone, a fax, or a modem. The present invention can reside in a server 112 or in a personal computer, for example. In contrast, previous systems couple a PBX, key system, or telephone, directly to a router 114. Routers are typically designed such that the user does not have the capability to add functionality thereto, other than that functionality provided by the manufacturer of the router. Accordingly, a router designer and manufacturer must include the aural transmission capability in the router. The user is thereby unable to modify an existing LAN environment to add voice communication capability without replacing the existing routers at a significant additional expense. The present invention enables a user of a LAN/WAN network to quickly and inexpensively add a near-toll-quality, transparent, aural transmission system to a network by installing hardware and software in a PC that are coupled to a LAN in the network. As described above, previous attempts at providing such functionality have provided solutions that are of lesser quality and are generally not acceptable for business use because the quality of the aural signal was low and the interface with the users was not transparent.

In the preferred embodiment, the present invention includes a phone/fax server card (PFSC) that is controlled by software, as described below. Preferably, the PFSC is located in one PC, one file server 112, or a dedicated CSU 130 per office or LAN site. File servers 112, or a CSU 130 are typically always operating. In contrast, a PC is generally less available because a user may turn off the PC or operate less robust programs than on a server 112 which can cause the PC to fail. However, in an alternate embodiment, one or more PFSCs can be installed in a PC that is connected to a LAN, e.g., for use in an office without a server on the LAN. For ease of discussion, the description set forth below will describe a telephone call between a user at a first telephone 106 and a user at a second telephone 126 wherein the user of the first telephone initiated the call and where the first telephone 106 is coupled to a file sever 112 via a KTS 110 and the second telephone is coupled to the CSU 130 via a PBX 128.

Figure 2:
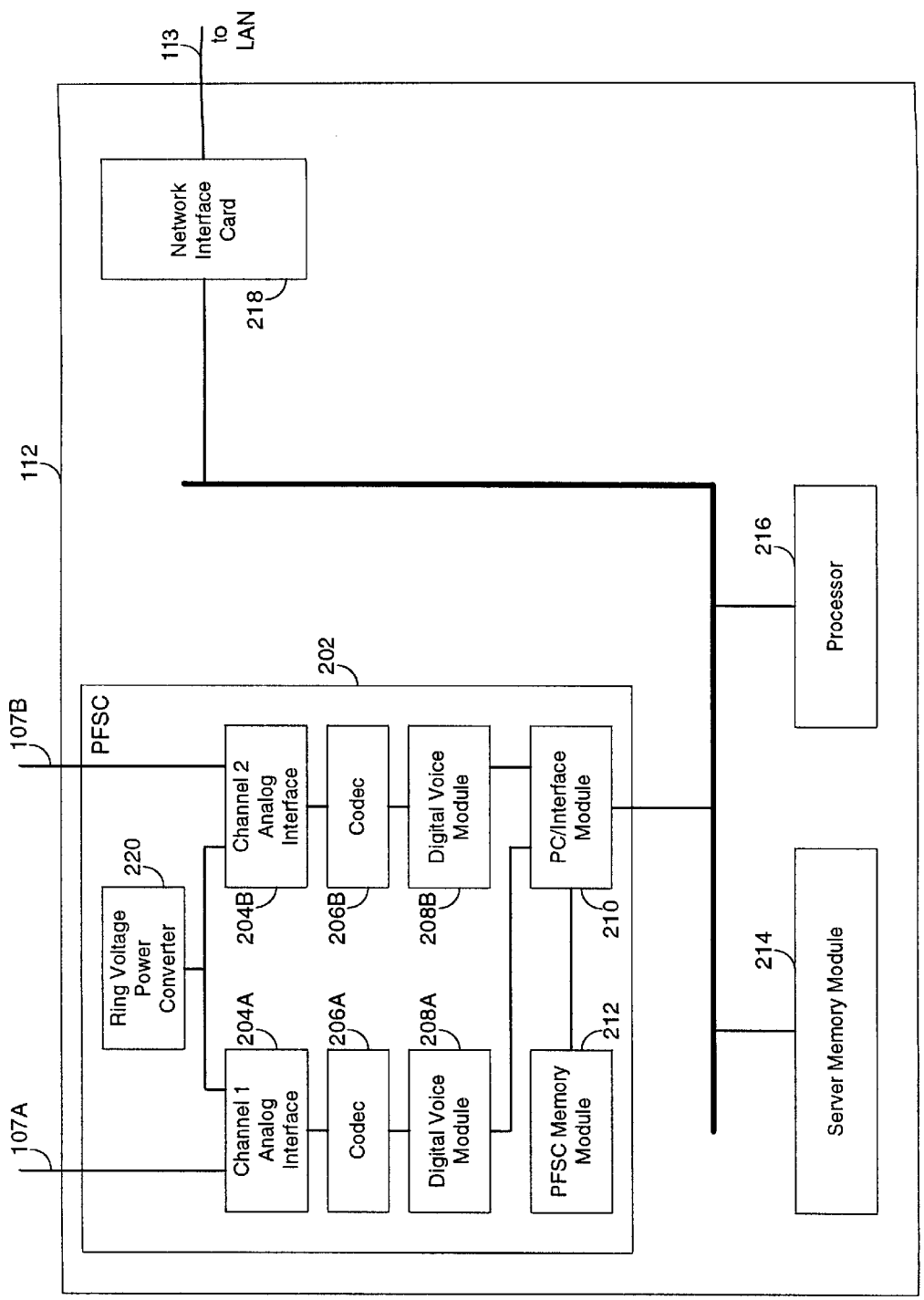
FIG. 2 is a more detailed illustration of a PC/file server, and a phone/fax server card installed therein, having an analog telephony interface according to the preferred embodiment of the present invention.

FIG. 2 is a more detailed illustration of a file server 112 and a PFSC 202 having an analog telephony interface according to the preferred embodiment of the present invention. With respect to the present invention, the CSU 130, the second file server 122, and a PC (not shown) each has a PFSC 202, and each operates in substantially the same manner as the file server 112. Any distinctions between the operation of the present invention and any of these devices are apparent to persons skilled in the relevant art. The file server 112 can be a conventional PC that is utilized as a file server. The file server 112 includes a network interface card (NIC) 218, a processor 216, a server memory module 214, and a PFSC 202. The NIC 218 can be a conventional NIC, for example, a 3C509 NIC that is commercially available from 3Com Corp., Santa Clara, Calif. The NIC 218 converts signals from the file server 112 into a format used by the LAN 116. A benefit of the present invention is that the PFSC 202 installs and operates in a standard manner that is compatible with the operating system of the server, e.g., Novell NetWare, Microsoft Windows 95, or Microsoft Windows NT server. The present invention utilizes the capabilities of the NIC 218 to convert the signals into the format used by the LAN 116. This simplifies the design and cost of the PFSC 202. The processor 216 of the file server 102A can be an x86 based processor or a Pentium Pro processor, for example, manufactured by Intel Corporation, Santa Clara, Calif. The server memory module 214 is a conventional random access memory (RAM) that includes an operating system and non-conventional application programs stored therein. The server memory module 214, and the non-conventional application programs are described in greater detail below.

The analog PFSC 202 includes a ring voltage power converter 220, two channel analog interfaces 204, two coder-decoders (codecs) 206, two digital voice modules (DVMs) 208, a PC interface module 210, and a PFSC memory module 212. Each channel analog interface 204 is connected to the trunk lines of the KTS 110. With respect to the PFSC in the CSU 130, the analog interface 204 is coupled to the trunk lines of a PBX. In general, each channel analog interface 204 connects to a telephony interface, e.g., a PBX, a KTS, telephones, faxes, and modems. Each channel analog interface 204 also provides ring voltages for foreign exchange station (FXS) interfaces and for ear and mouth (E&M) interfaces. If the analog interface 204 is connected to a foreign exchange office (FXO), the analog interface 204 performs conventional ring detection, loop closure, loop open detection, and 2 to 4 wire conversion using, for example, transformers or solid state circuitry. The operation of the channel analog interfaces 204 is described in greater detail below. The codec 206 is a conventional codec, for example, model number 3070, that is commercially available from National Semiconductors, Santa Clara, Calif. The codec receives analog signals from the channel analog interface 204 and converts these signals into a digital signal, e.g., a pulse code modulation (PCM) signal using a conventional conversion technique. The rate of the bit stream generated by the codec is 64 kilobits per second (kbps). These bits are sent to the DVM 208. The DVM determines the type of signal represented by the bits, e.g., a voice signal, a fax signal or a modem signal, then the bits are framed and sent to the PC/interface module 210. If the bits represent a voice signal, then the DVM 208 compresses the bits, generates correction information that is used to regenerate information that may be lost during transmission, organizes the bits and the correction information into frames, and transmits the frames to the PC/interface module 210. The PC/interface module 210 stores the frames in the PFSC memory module 202 and notifies the server 112 that a frame is available. The operation of the PFSC 202 is described in greater detail below.

Figure 3:
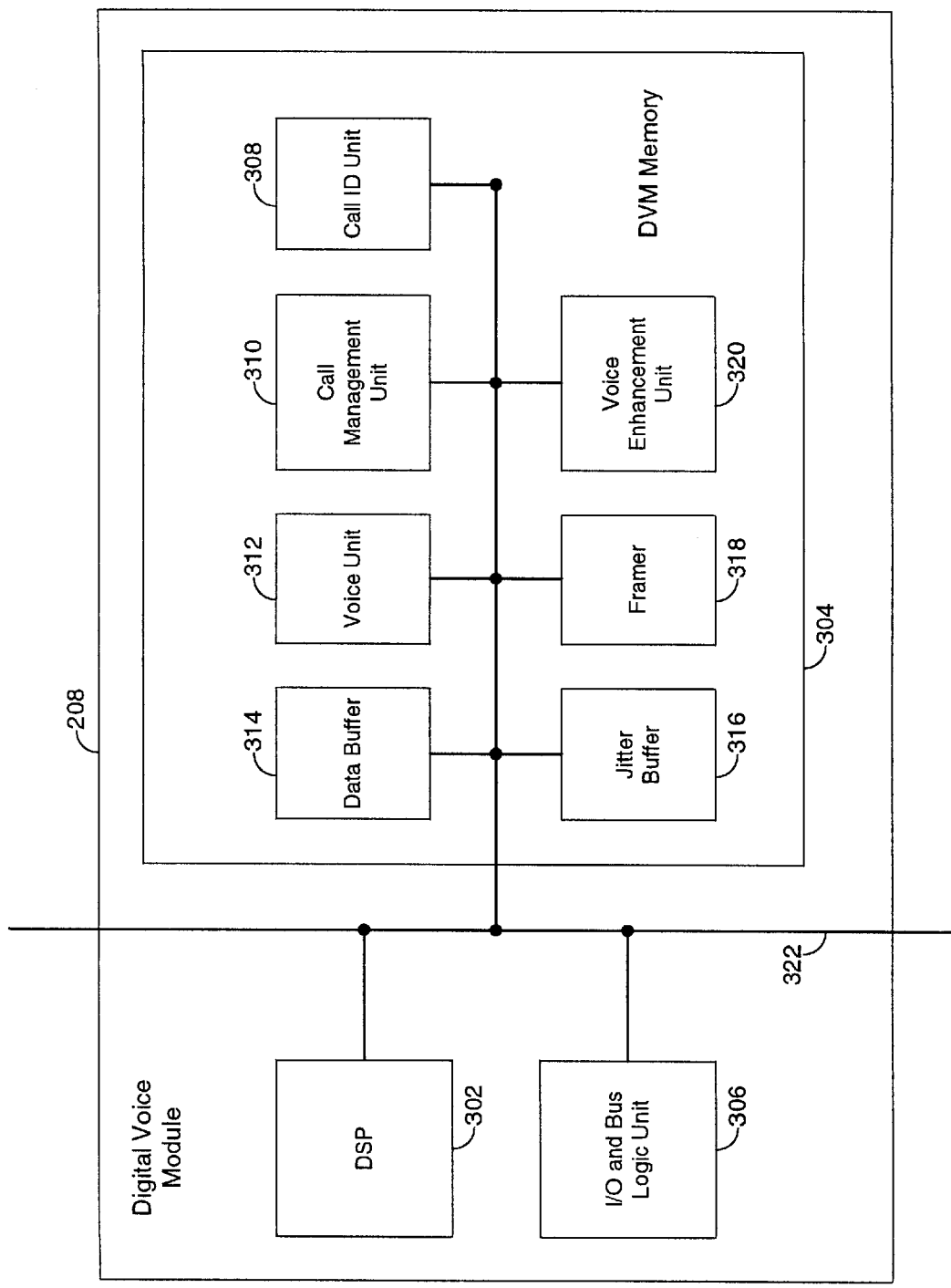
FIG. 3 is a more detailed illustration of a digital voice module component of the phone/fax server card according to the preferred embodiment of the present invention.

FIG. 3 is a more detailed illustration of the DVM 208 according to the preferred embodiment of the present invention. The DVM 208 includes a digital signal processor (DSP) 302 coupled to a data bus 322. In addition, the DVM 208 includes an input/output (I/O) and bus logic unit 306 and a DVM memory module 304 each of which is coupled to the data bus 322. The DSP 302 is a conventional processor, e.g., a TI 320C52-80 DSP that is commercially available from Texas Instruments Inc., Dallas, Tex. The I/O and bus logic unit 306 includes conventional address decoding logic and bus interface logic. The DVM memory 304 is comprised of conventional memory, e.g., static random access memory (SRAM), and flash erasable programmable read only memory (EPROM). The DVM memory 304 stores a data buffer 314 and a Call ID Unit 308 that, when executed by the DSP 302, determines the type of signals received, e.g., voice, fax, or modem signals. Depending on the type of signals received, the Call ID Unit 308 instructs the DVM 208 to store various other functional modules in the DVM memory 304. If the received signals are either fax signals or modem signals, a framer 318 and a call management unit 310 are stored in the DVM memory 304 for creating data frames from the received data. If the received signals are voice signals, then the Call ID unit 308 instructs the DVM 208 to store a call management unit 310, a voice unit 312, a jitter buffer 316, a framer 318, and a voice enhancement unit 320 in the DVM memory 304.

The functional modules operate in conjunction with the DSP 302. The call management unit 310 receives signals representing server codes and destination address identifiers. The call management unit 310 also determines when a preferred number of signals, representing dialed digits, are received and transmits these digits to the PC/interface module 210. The call management unit 310 also performs other telephony functions including echo canceling, DTMF tone detection and generation, pulse dialing, modem and fax tone detection and generation, and generating instructions requesting the generation of a ring voltage. The voice unit 312 receives the 64 kbps bit stream from the codec 206A and converts the bit stream into an 8 kbps bit stream using a conventional compression technique. The voice unit 312 also decompresses a bit stream received from the PC/interface module 210 and transmits the decompressed signal to the codec 206, e.g., when the DVM 208 receives voice signals. The data buffer 314 temporarily stores data until the data is transmitted to either the codec 206 or the PC/interface module 210. The jitter buffer 316 is a variable length buffer that stores voice signals received from the PC/interface module 210. The size of the jitter buffer is dependent upon the variation in the end-to-end packet delay in the network and can be dynamically adjusted based upon, for example, this packet delay variation.

The voice enhancement unit 320 performs a forward-error-correction (FEC) operation to generate bits that can be used to recreate a lost packet. In an alternate embodiment, the voice enhancement unit can be a part of the server memory module 214. When receiving voice signals, the voice enhancement unit 320 performs the packet recreation process. The voice enhancement unit 320 also generates a time stamp that identifies the sequencing of packets, allowing the destination server to estimate when a subsequent packet of data is to be received. If this time expires before the subsequent packet is received, the voice enhancement unit of the destination server 320 recreates the packet. The packet recreation technique is described below. The voice enhancement unit 320 also dynamically measures the end-to-end delay in the network and adjusts the size of the jitter buffer 316 accordingly, as described above. The voice enhancement unit 320 can also dynamically adjust the rate of the bit stream from 8 kbps in the preferred embodiment to a slower rate, e.g., 6.4 kbps or 4.8 kbps. The framer 318 creates a frame that includes data representing a predetermined amount of voice signals, e.g., 20 milliseconds (ms). The framer 318 can also includes time stamp information, and, if selected, FEC information in a frame. The operation of the DVM 208 is described in greater detail below.

Figure 4:
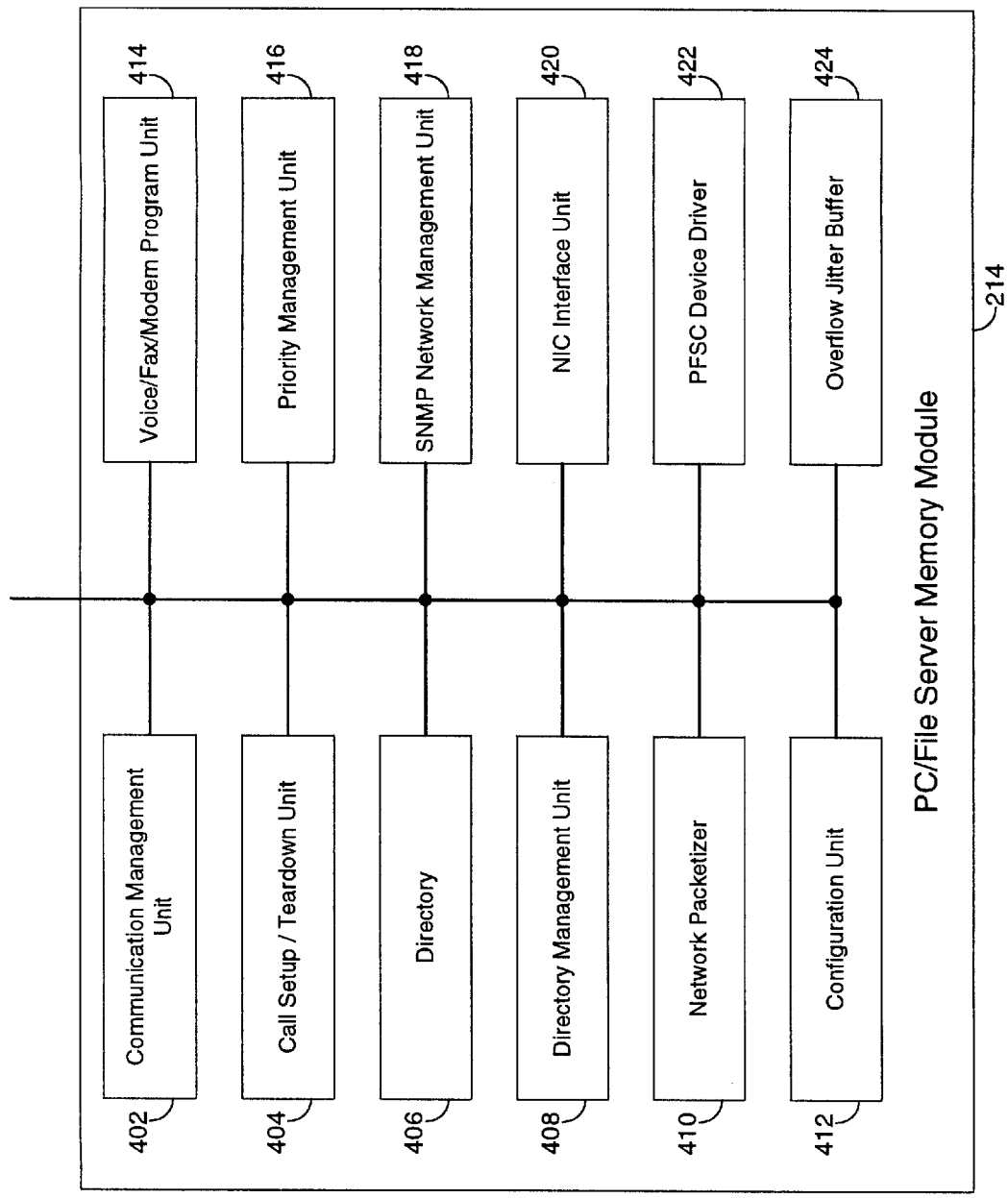
FIG. 4 is a more detailed illustration of a PC/file server memory module according to the preferred embodiment of the present invention.

FIG. 4 is a more detailed illustration of the server memory module 214 according to the preferred embodiment of the present invention. The server memory module 214 is a conventional random access memory (RAM) that includes non-conventional application programs. These application programs include a communication management unit 402, a call setup/tear-down unit 404, a directory 406, a directory management unit 408, a network packetizer 410, a configuration unit 412, a voice/fax/modem program unit 414, a priority management unit 416, a standard network management protocol (SNMP) network management unit 418, a NIC interface unit 420, a PFSC device driver 422, and an overflow jitter buffer 424.

The communication management unit 402 determines the type of data that a received frame or packet represents, e.g., voice, fax, modem, or another type of data. Based upon this determination, the communication management unit 402 calls the other various functional programs to properly evaluate and transmit the data. The call setup/tear-down unit 404 performs and controls the call setup procedure and the call tear-down procedure, as described below. The directory includes server code identifiers and a network address associated with each server code identifier. The directory management unit 408 controls access to the directory. In addition, the directory management unit can request that a search be performed in a master directory for a server code that in not in the local directory, e.g., directory 406. The master directory is located at one server in the network 100 and typically contains the most current version of the network directory. In some network environments, the master directory transmits its contents periodically, e.g., daily, to all of the local directories in the network 100. When transmitting data, the network packetizer creates a packet of data that includes one or more frames and adds a packet header that includes the network address of the destination CSU. When receiving data, the network packetizer receives a packet, and removes the packet header. The configuration unit 412 includes information identifying each of the one or more PFSCs 202 on the server 112 and information identifying each channel address for each PFSC 202. In addition, the configuration unit 412 includes information identifying the type of dial tone, ring tone, and call progress tone, e.g., as used in a particular country, and the type of telephony service on each channel, e.g., FXO, FXS, or E&M.

The voice/fax/modem program unit 414 includes functional program modules that are transferred into the DVM memory 304, e.g., the voice unit 312 and the voice enhancement unit 320. The priority management unit 416 controls the data priority request process, as described below. The SNMP network management unit 418 controls the conventional SNMP for the server. The SNMP permits remote reporting of the server status and modification of server configuration parameters, e.g., modification of the jitter buffer size and enablement and disablement of the FEC process. The NIC interface unit converts the packets into a format that is compatible with the LAN attached to the server, e.g., ethernet or token ring. The format, e.g., the protocol, required by these LANs is known and the procedure for converting a data packet to a compatible format is apparent to persons skilled in the relevant art. The PFSC device driver 422 enables the server to communicate with the PFSC 202 by providing, for example, a conventional interrupt process to transfer data and management information between the server and the PFSC 202. The overflow jitter buffer 424 permits data to be temporarily stored when network delay variation is larger than what can be properly handled by the jitter buffer 316. The functions performed by the functional programs are described in greater detail below with reference to FIGS. 5–6.

Figure 5:
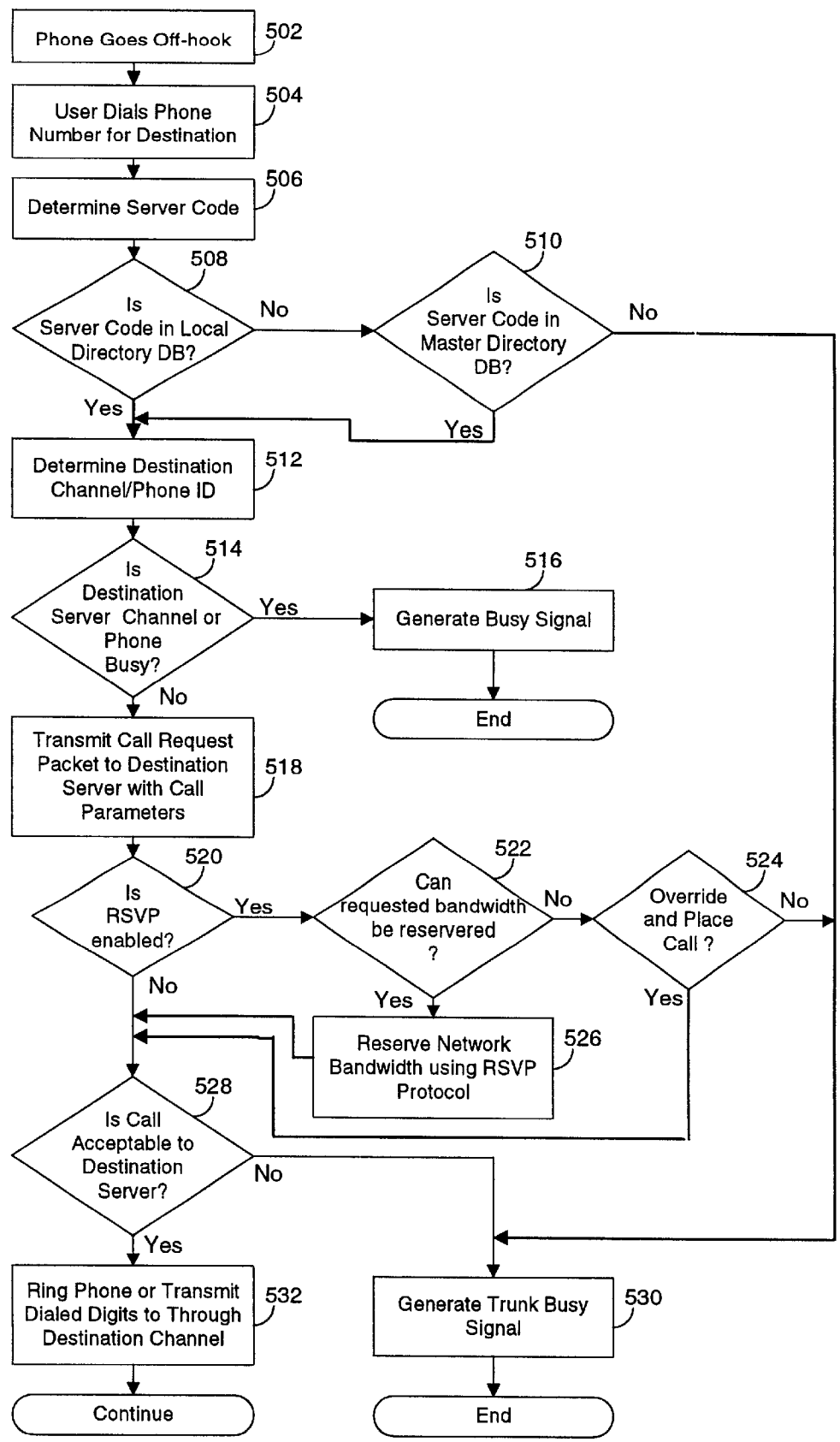
FIG. 5 is a flow chart illustrating a call setup procedure according to the preferred embodiment of the present invention.

FIG. 5 is a flow chart illustrating a call setup procedure according to the preferred embodiment of the present invention. For the example described below, the telephone call setup procedure provides a connection between the first telephone 106 and the second telephone 126. The first telephone is connected to a KTS 110 that is connected to a PFSC 202 via channel 1 and the second telephone is connected to a PBX 128 that is connected to a PFSC via channel 1. A user activates the telephone by, for example, lifting a handset and selecting the channel line in order to transition 502 to an off-hook state. The first channel analog interface 204A, using conventional procedures, detects the off-hook condition and generates a conventional dial tone that is transmitted to the KTS 110 and to the first telephone 106. A user, hearing a dial tone, dials a telephone number that is associated with the second phone. The procedure utilized by the user when placing a telephone call over the WAN 102 is the same as the procedure used by the user if he/she were to use a conventional public telephone system. That is, the user activates a telephone (or fax or modem), dials a number identified with the destination telephone (or fax or modem), speaks into a conventional microphone in a telephone and, when the other person speaks, or the fax or modem transmits the destination user receives a signal having a quality that approaches, equals, or exceeds the quality of an aural signal transmitted through a public switched network. That is, the procedure for using the present invention is "transparent" to the user. Accordingly, users do not need to re-learn how to use the present invention and do not notice any significant difference in the quality of the signal.

The user transparently enters 504 a telephone number that uniquely identifies the destination telephone using, for example, a keypad or a rotary dial on a telephone. In the preferred embodiment, the first set of digits identifies the destination CSU 130 through which the second telephone 126 is connected to the second LAN 134. This set of digits is called the server code. The number of digits in the server code is, generally, predetermined as a configuration parameter. However, in alternate embodiments, the number of digits in the server code can vary depending upon, for example, the destination CSU. In the preferred embodiment, the server code is from 1–16 digits in length and is fixed for the network as a network configuration parameter. The channel 1 analog interface 204A sequentially receives the digits and the codec 106A converts the received analog signal into a digital signal. The call management unit 310 in the DVM 208A receives the signals representing the digits and stores a digit representation in the data buffer 314. When the call management unit 310 receives 506 all digits of the server code, it transmits the server code to the PFSC memory module 212 and the PC/interface module 210 generates an interrupt signal to the server 112.

The PFSC device driver 422 receives the interrupt and notifies the communication management unit (CMU) 402 of the interrupt. The CMU 402 then notifies the call setup/tear-down unit 404. The call setup/tear-down unit 404 retrieves the server code from the PFSC memory module 212 and transmits the server code to the directory management unit 408. The directory management unit 408 searches the local directory 406 for a server that is identified with the server code. If no server matches 508 the received server code in the local directory 406, the directory management unit 408 generates a request to a master directory. A directory management unit for the master directory determines 510 if the received server code is identified with any server in the network. As described above, the master directory is more accurate than the local directory 406. If no server is identified with the server code, an error condition exists and the DVM 208A instructs the channel 1 analog interface 204A to transmit a trunk busy signal to the first telephone 106. If the server code is identified in the master directory, the network address of the destination CSU associated with the server code is transmitted to the directory management unit 408 along with a indication of the number of additional digits that the destination CSU uses to precisely identify an attached device, e.g., a telephone, a fax, or a modem. The number of additional digits can vary depending upon the number of channels and the number of aural devices the destination CSU supports. The directory management unit transmits the network address of the destination server and the number of addition digits to the call setup/tear-down unit 404. The call setup/tear-down unit 404 transmits the number of additional digits to the call management unit 310 of the PFSC 202 via the PFSC device driver 422.

The user continues dialing and the call management unit stores the digit information in the data buffer 314. After receiving the required number of additional digits or after a period without receiving any additionally dialed digits, e.g., 10 seconds, the call management unit 310 transmits these digits to the call setup/tear-down unit 404 using the technique described above with respect to transmission of the server code. The call setup/tear-down unit 404 determines 512 the destination channel (or telephone identifier) and transmits a call setup packet to the destination CSU 130. The destination CSU 130 receives the setup packet and determines 514 if the channel or telephone is available. If the channel (or telephone) is not available, the destination CSU 130 transmits a packet to the first server 112 indicating that the channel (or telephone) is busy. If the PBX 128 communicates with the destination CSU 130 digitally, e.g., using a T1 or E1 line then a single connection can be used for many telephones, e.g., up to 24 phones/channel for a T1 link. Therefore, the destination CSU 130 determines 514 if the destination telephone 126 is busy using a conventional detection procedure. An example of a PFSC operating with a digital telephone line is described below with reference to FIG. 8. The call setup/tear-down unit 404 receives the packet and notifies the call management unit 310 that the destination channel (or telephone) is busy. After receiving this notification, the call management unit 310 instructs the channel 1 analog interface 107A to generate and transmit 516 a busy signal to the first telephone 106.

If the channel (or telephone) is available, the destination CSU 130 transmits an acknowledgment packet to the first server 112 indicating that it is available. The call setup/tear-down unit 404 receives the acknowledgment packet and generates and transmits 518 a call request packet to the destination CSU 130. The call request packet includes an indication as to whether 520 a call priority is to be requested. The preferred embodiment uses the resource reservation protocol (RSVP) to reserve bandwidth across the WAN 104. The operation of the RSVP is known to persons skilled in the relevant art. A description of the RSVP is set forth in R. Braden et al, *Resource ReSerVation Protocol (RSVP)— Version* 1 *Functional Specification*, Internet Engineering Task Force (IETF), (Mar. 18, 1996), which is incorporated herein in its entirety. The call setup/tear-down unit 404 activates the priority management unit 416 to request a reservation of bandwidth across the WAN 104. The priority management unit 416 identifies the amount of bandwidth to be reserved. The destination CSU 130 receives the call setup packet and reserves the channel for the call. If a call priority is requested, the first server 112 and the destination CSU 130 implement RSVP to determine 522 if the requested bandwidth can be reserved by reservation requests transmitted to the network. A call acceptance packet is then returned to the first server 112 after the bandwidth reservation attempt. If the requested bandwidth cannot be reserved, the call setup/tear-down unit 404 can connect 524 the call anyway 524, albeit with a lower quality, or a busy signal can be generated 530 using the technique described above. In an alternate embodiment, router priority protocols, e.g., weighted fair queuing (WFQ) or traffic prioritization, can be used to assure priority across the WAN 104. If the call parameters, e.g., bandwidth reservation success, jitter buffer size, FEC characteristics are acceptable 528 to the first server 112, and the destination CSU 130, the destination CSU 130 instructs the channel 1 analog interface in its PFSC to ring 532 the destination telephone using the ring voltage power converter 220. The ring voltage power converter 220 is coupled to the power supply of the destination CSU 130 and converts the voltage from, for example, a 5 volt signal, to a ring voltage, e.g., a 160 volt signal, that when transmitted to the second telephone 126 will cause the second telephone 126 to ring. If the call is not acceptable, a busy signal is transmitted to the first telephone 106, as described above.

The procedure for setting up a call for fax or modem transmission is similar to setting up a telephone call, as described above, except that the end-to-end delay of the signal is, typically, not as important as it is for voice communication, and therefore, bandwidth across the WAN 104 does not need to be reserved. However, the present invention can reserve bandwidth for fax or modem communications.

Figure 6A:
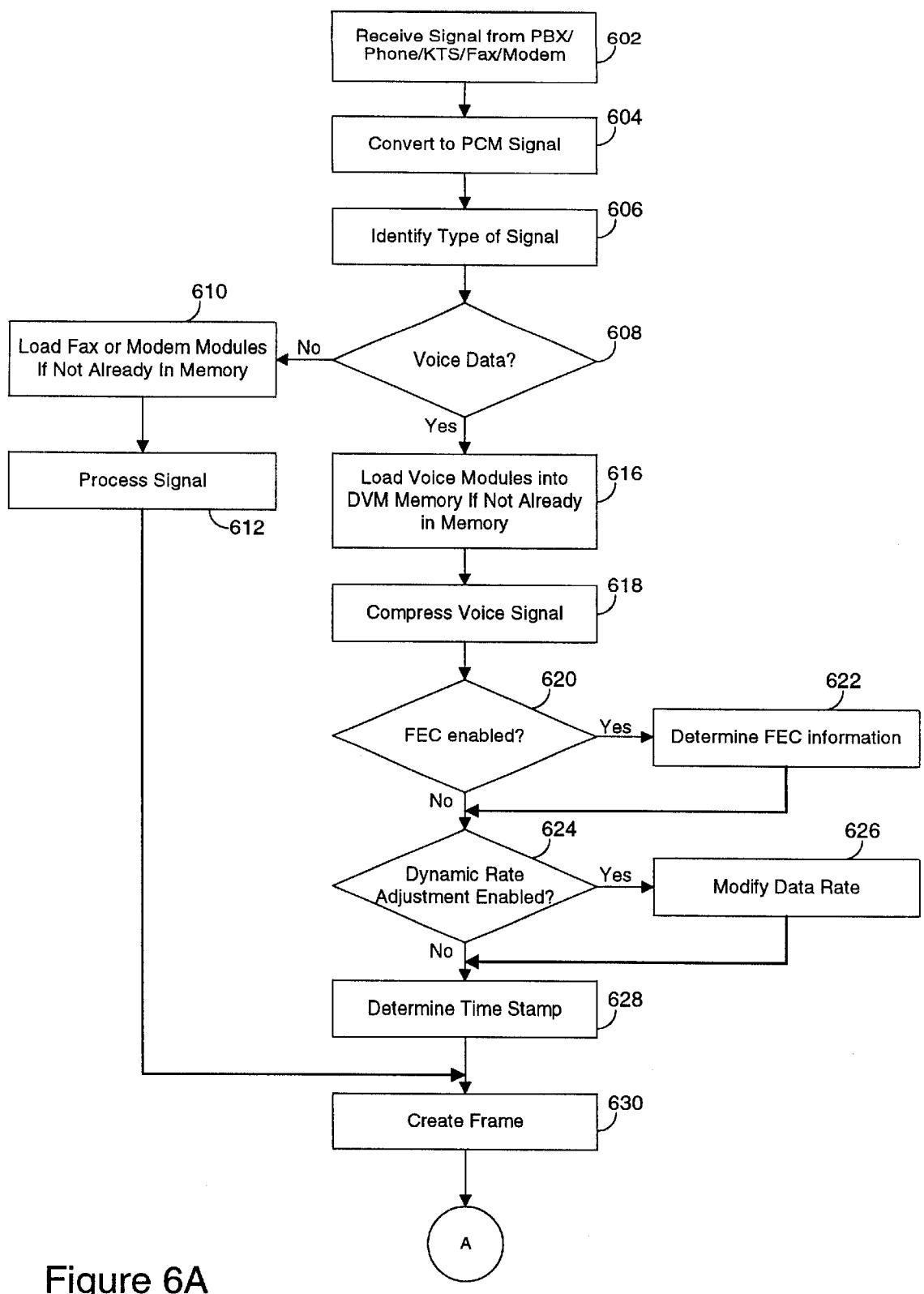
FIGS. 6A and 6B are flow charts illustrating an aural signal transmission procedure according to the preferred embodiment of the present invention.
Figure 6B:
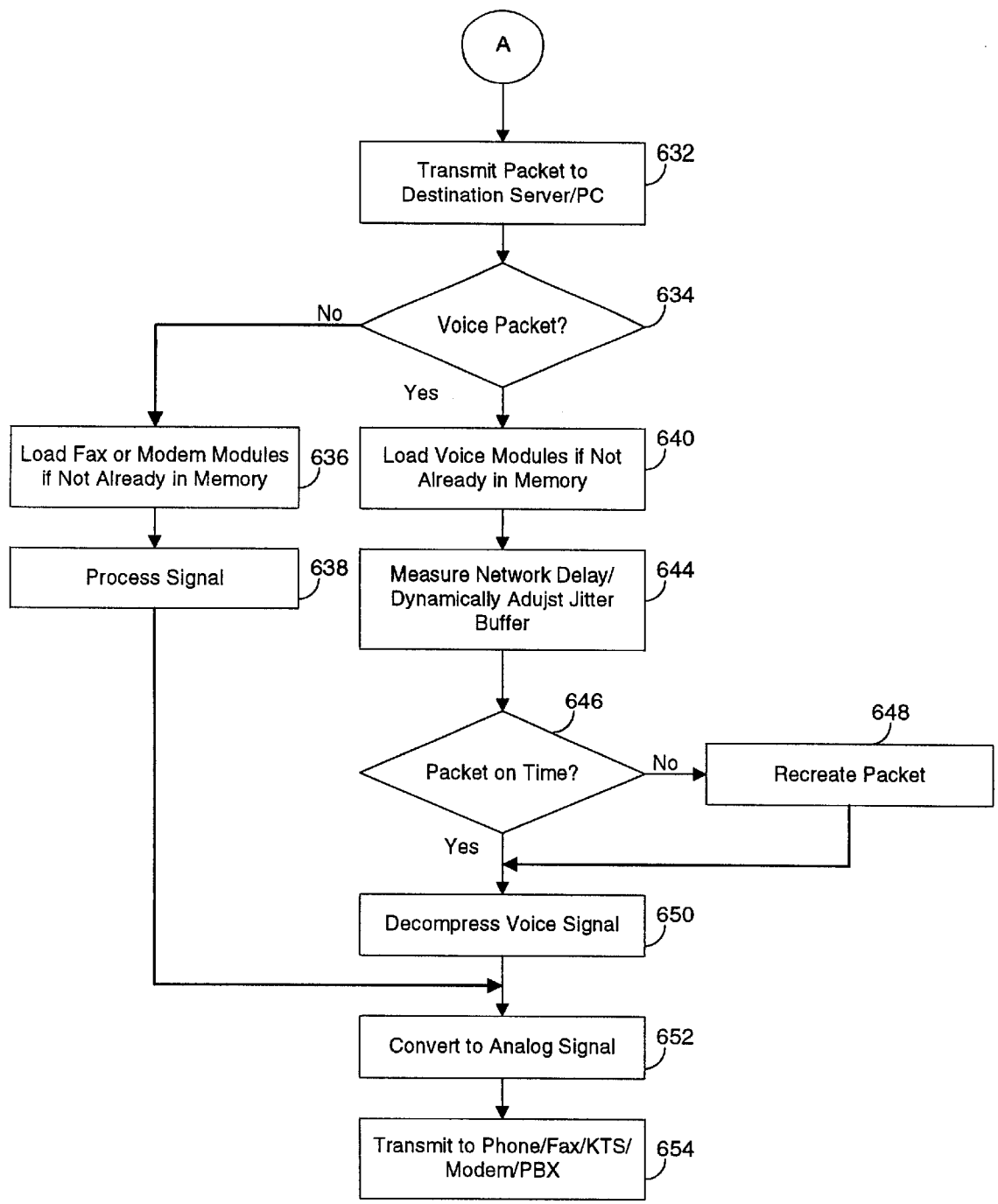

FIGS. 6A and 6B are flow charts illustrating a voice signal transmission procedure according to the preferred embodiment of the present invention. After a connection is setup, aural traffic, e.g., voice, fax, or modem signal, can be transmitted between the first telephone 106 and the second telephone 126. A user transparently generates aural information that is received 602 by the channel 1 analog interface 204A. As described above, the aural information is transparently generated because the user operates the aural signal generating device, e.g., a telephone, a fax machine, or a modem, in the same manner used when communicating via a public telephone system. The transparent generation of voice signals is described above. The user transparently generates fax signals by, for example, placing a sheet of paper in a transmitting fax machine, dialing a code on the transmitting fax machine, e.g., on a keypad on the fax, that identifies a receiving fax machine, and pressing a "send" key. Similarly, data can be transmitted via a modem by identifying a file to be transmitted, inputting a receiving modem identification code, and transmitting the data. As described above, a feature of the present invention is that the technique used to operate the aural signal generating devices does not change. Accordingly, users do not need to be trained how to use these devices, e.g., users do not need to be trained to place a telephone call.

The channel 1 analog interface 204A receives the aural signal and transmits the signal to the codec 206A. The codec 206A converts 604 the analog signal to a PCM signal using a standard technique. The PCM signal is transmitted to the DVM 208A. The call ID unit 308 identifies 606 the type of aural signal that is received and determines if the signal is valid and supported, e.g., if it is voice, fax, or modem data, or if the modem rate is supported. The technique for identifying the type of signal is described in U.S. Pat. No. 5,187,591 entitled SYSTEM FOR TRANSMITTING AND RECEIVING AURAL INFORMATION AND MODULATED DATA, to Guy et al., that is incorporated by reference herein in its entirety.

If the aural signal is identified 608 as a fax signal, the call management unit 310 transmits a signal to the communication management unit 402 requesting that copies of the fax program modules be transmitted 610 to the DVM memory 304 from the voice/fax/modem program unit 414 if not already present in the DVM memory 304. The fax program modules includes a fax unit (not shown) and a framer (not shown). The fax unit performs fax signal modulation 612 and demodulation and the framer creates frames of data. Similarly, if the aural signal is identified 608 as a modem signal, the call management unit 310 transmits a signal to the communication management unit 402 requesting that copies of the modem program modules be transmitted 610 to the DVM memory 304 from the voice/fax/modem program unit 414 if not already present in the DVM memory 304. The modem program modules include a modem unit (not shown) and a framer (not shown). The modem unit performs modulation 612 and demodulation on the received modem signals and the framer creates frames of data from the demodulated signal. If the aural signal is identified 608 as a voice signal, the call management unit 310 transmits a signal to the communication management unit 402 requesting that copies of the voice program modules be transmitted 616 to the DVM memory 304 from the voice/fax/modem program unit 414 if not already present in the DVM memory 304. The voice program modules include a voice unit 312, a framer 318, and a voice enhancement unit 320. In addition, portions of memory are set aside as a data buffer 314 and as a jitter buffer 316. The jitter buffer 316 can be used for voice signals, fax signals, and modem signals, for example.

If the signal is a voice signal, the voice unit 312 compresses 618 the PCM signal from a 64 kbps signal to an 8 kbps signal using a conventional compression algorithm. In the preferred embodiment, the compression algorithm is the ITU G.729 compression algorithm and is described in International Telecommunication Union (ITU) Telecommunications Standardization Sector, *Draft Recommendation G.729, Coding of Speech at 8 kbit/s using Conlugate-Structure Algebraic-Code-Excited Linear-Predictive (CS-ACELP) Coding*, Ver. 6.1 (Jun. 21, 1995), that is incorporated by reference herein in its entirety. A benefit of the preferred embodiment is that functions that are computationally intensive, e.g., data compression and decompression, are performed by the DSP 302 in the PFSC 208 as opposed to the server's processor 216. Therefore, the computational load on the server's processor 216 is minimal. The server's processor 216 principally performs administrative functions for the PFSC system, e.g., setup, tear-down, priority reservation, and call accounting.

A forward error correction (FEC) function can be enabled automatically, if a predetermined percentage of packets are not being received by the second server 130 in a timely manner, or enabled manually either by the server 112 or remotely, using the SNMP network management unit 418. If enabled 620, the FEC function is performed by the voice enhancement unit 320. Performing FEC enables the destination CSU 130 to recreate packets of data that are lost in transmission or are not received by the second server by a particular time. In the preferred embodiment, the framer 318 generates a frame that includes approximately 20 ms of voice information. After generating the frame, the frame is transmitted to and stored in the server memory module 214. After receiving two frames, the network packetizer 410 creates a packet that includes approximately 40 ms of voice information, e.g., two 20 ms frames. The FEC information is included in the packet.

Figure 7:
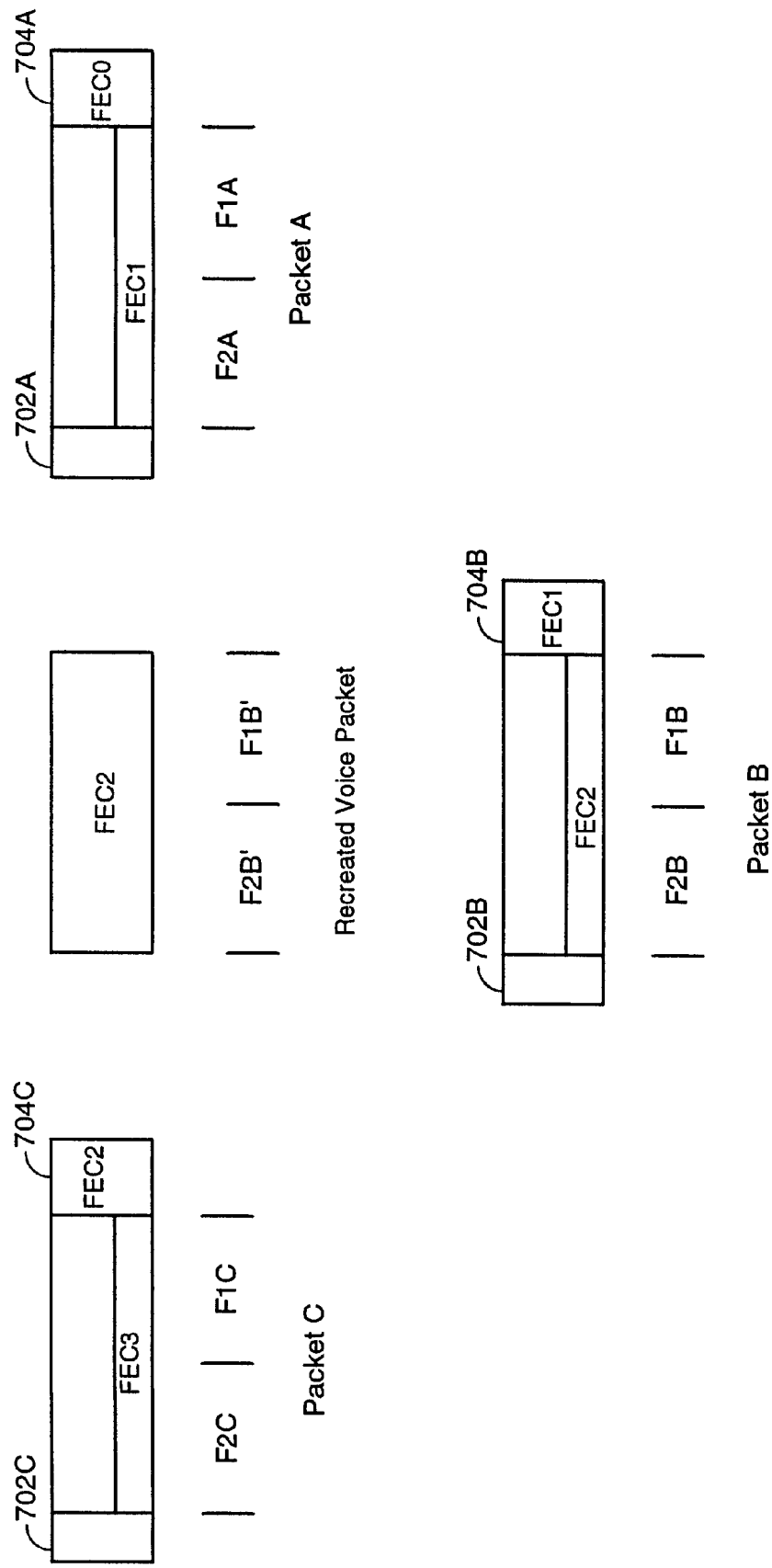
FIG. 7 is an example of the forward error correction (FEC) process illustrating three voice packets, packet A, packet B, and packet C.

FIG. 7 is an example of the forward error correction (FEC) process illustrating three voice packets, packet A, packet B, and packet C. Each packet includes a packet header 702, two frames of voice data, F1 and F2, and FEC information 704. In the preferred embodiment, the FEC information 704 includes 622 reduced-quality voice data from the previous packet, e.g., approximately 25–50 percent of the data from the previous packet. For example, for Packet C in FIG. 7, the FEC information is in correction block FEC3 and includes partial information from the data portion of the previously transmitted packet, i.e., Packet B. This partial information is, generally, the frame-to-frame predictive information and pitch value for the first sub-frame of a G.729 implementation. A goal of the present invention is to enable aural information to be transmitted across a LAN 116, a WAN 104, and another LAN 134 transparently as an overlay on the existing IP capabilities of the LANs 116, 134 and WAN 104. This technique is also known as "Voice-over-IP". The quality of present invention is approaches, equals, or exceeds the quality of the public telephone systems. For example, in general, a user can detect a 40 ms gap in a conversation. That is, the loss of a single packet can be detected by the user. However, a 40 ms gap that is reconstructed from a reduced set of parameters of the missing signal is generally not detectable by the user. Accordingly, to increase voice quality, the present invention stores a reduced-quality version consisting of partial voice data from the previous packet as FEC information 704. If packet B is lost, packet B can be recreated by using the FEC information 704C in packet C to produce F1B' and F2B' signals similar to the lost F1B and F2B signals. As stated above, in the preferred embodiment, the frame-to-frame predictive information and pitch parameters of a G.729 implementation provides the partial data for forward error correction. FIG. 7 illustrates one technique for recreating a lost packet, e.g., Packet B. Using the FEC results in a slightly reduced quality signal to replace lost packet B. The loss of quality of the resulting signal is generally not detectable by the user for packet losses up to approximately ten percent. It will be apparent to persons skilled in the relevant art that other implementations of correction information can be used.

In heavy traffic conditions, the WAN 104 may be unable to provide the requested bandwidth. In this situation, for example, the present invention can, optionally, dynamically adjust the rate of data transmission with only a minor decrease in the voice quality. If enabled 624 the voice enhancement unit 320 reduces 626 the bit rate from approximately 8 kbps to approximately 6.4 kbps by eliminating twenty percent of voice data for each frame. For example, if each 20 ms frame includes 10 bytes of data, the last 2 bytes of data, or two non-consecutive bytes of data, are not included in the frame. The resulting frame has a size of 8 bytes and, accordingly, the bit rate is reduced 20 percent since only each frame is 20 percent smaller. Similarly, the voice enhancement unit 320 can reduce the bit rate by forty percent, to 4.8 kbps by not including forty percent of the voice data for each frame.

For every second frame, the call management unit 310 generates 628 a time stamp representing time as a counter which represents the number of voice samples processed. The time stamp is used to determine when a the subsequently transmitted packet is late, as described below. In an alternate embodiment, the time stamp can be provided by the server 112 as it forms the frames into packets.

The framer 318 creates 630 a frame that includes approximately 20 ms of voice data. In addition, every second frame of voice data is associated with time stamp information and, if enabled, the framer generates a FEC frame that includes a reduced quality representation of data from frames transmitted in the previous packet.

The frames are received by the network packetizer 410 that compiles two frames, the time stamp information, and, if enabled, FEC information. The network packetizer then adds a packet header 702 that includes the network address of the second telephone 126. For example, the network address of the second telephone 126 can include the network address of the destination CSU and information identifying the PFSC 202 channel or PBX 128 channel of the second telephone 126. The communication management unit 402 then transmits 632 the packet through the NIC 218 to the router 114 (or switch) of the first LAN 116. The router 114 transmits the packet through the WAN 104 and the packet is received by the router 132 (or switch) of the second LAN 134. The router 132 transmits the packet to the destination CSU 130. The destination CSU 130 can include many PFSCs 202. The operation of the destination CSU 130 will be described with reference to the PFSC 202 and the server memory module 214 of FIG. 2.

After receiving a packet, the network packetizer 410 removes the packet header and transmits the packet to the DVM 208. If the packet contains 636 fax data, the call management unit 310 instructs the communication management unit 402 to load 636 the fax program modules into the DVM memory 304, if the modules are not already present, using the technique described above. The fax unit then processes 638 the signal. If the packet contains 636 modem data, the call management unit 310 instructs the communication management unit 402 to load 636 the modem program modules into the DVM memory 304, if the modules are not already present, using the technique described above. The modem unit then processes the signal. Similarly, if the packet contains 636 voice data, the call management unit 310 instructs the communication management unit 402 to load 640 the voice program modules into the DVM memory 304, if the modules are not already present, using the technique described above. In an alternate embodiment the DVM memory 304 is large enough to store all of the voice, fax, and modem program modules and, therefore, these program modules are only transmitted to the DVM memory 304 once.

The voice enhancement unit 320 then dynamically determines 644 the end-to-end network delay. This variation in the delay can be used to modify the size of the jitter buffer 316, and the overflow jitter buffer 424. The size of the jitter buffer 316 and the overflow jitter buffer 424 are directly proportional to the expected variation in the network delay. Specifically, the jitter buffer 316 buffers frames that are received by the DVM 208. In an ideal network the network delay is constant. Therefore, when the DVM 208 receives a voice frame, the DVM 208 can decompress the voice frame and immediately transmit it to the second telephone 126. However, if a packet is delayed, then the resulting transmission of the aural signal to the second telephone 126 is also delayed. Such a delay is undesirable because of the resulting poor aural signal quality. Accordingly, the present invention utilizes a jitter buffer 316 to allow for fluctuations in the receipt of packets. In the preferred embodiment, the jitter buffer 316 is a first-in-first-out buffer that stores voice frames and has a size that is set in response to network end-to-end characteristics, e.g., network delay, that can be determined during the call set-up procedure. In an alternate embodiment, the jitter buffer 316 can also be adjusted dynamically during the call. If the jitter buffer 316 is too small, then a large network delay variation can result in an aural transmission gap at the second telephone 126. However, increasing the jitter buffer 316 also increases the end-to-end network delay since the jitter buffer 316 stores the voice frames for a time duration that is proportional to the size of the jitter buffer 316. The present invention adjusts the jitter buffer 316 by measuring 644 the network delay for each call and modifying the size of the jitter buffer 316 to reflect the network characteristics for that call.

If a packet is late 646, e.g., if the jitter buffer contents up to the packet have been used, then the voice enhancement unit 320 recreates 648 the late packet using the FEC information in the next packet. If the packet then arrives late, it is discarded, or if not all two frames of the packet have been recreated and transmitted to the second telephone 126, the actual data can be substituted for the reduced quality FEC data for the remaining frames in the packet. The technique for recreating the packet is described above.

The voice unit 312 then decompresses 650 the voice frame using the G7.29 decompression algorithm. The decompressed signal is transmitted to the codec 206 which converts 652 the decompressed signal to an analog signal. The codec 206 transmits the signal to the channel 1 analog interface 204 that transmits the signal to the PBX 128. The PBX 128 then transmits 654 the aural signal to the second telephone 126. The user of the second telephone transparently receives the aural signals, e.g., the second user hears the aural signals through a speaker in a telephone handset.

In the present invention, a call is terminated transparently. That is, a user terminates a telephone call by hanging up a telephone. The call management unit 310 detects this condition, performs a conventional tear-down procedure, and notifies the call management unit 402 which instructs the priority management unit 416 to release the reserved bandwidth.

The present invention typically provides an end-to-end network delay, with the FEC procedure enabled, of less than 200 ms. The present invention also has the ability to dynamically adjust the jitter buffer size and to recreate delayed or lost voice frames. The result is a system and method that provides an aural signal transmission quality that is close to or exceeds the transmission quality of conventional public switched networks.

In addition, the present invention has the ability to use an overflow jitter buffer to operate over networks, e.g., the Internet, having end-to-end delay up to several seconds when not utilizing a transmission priority technique , e.g., RSVP, and provides a recognizable voice signal that is generally of a lower quality.

Figure 8:
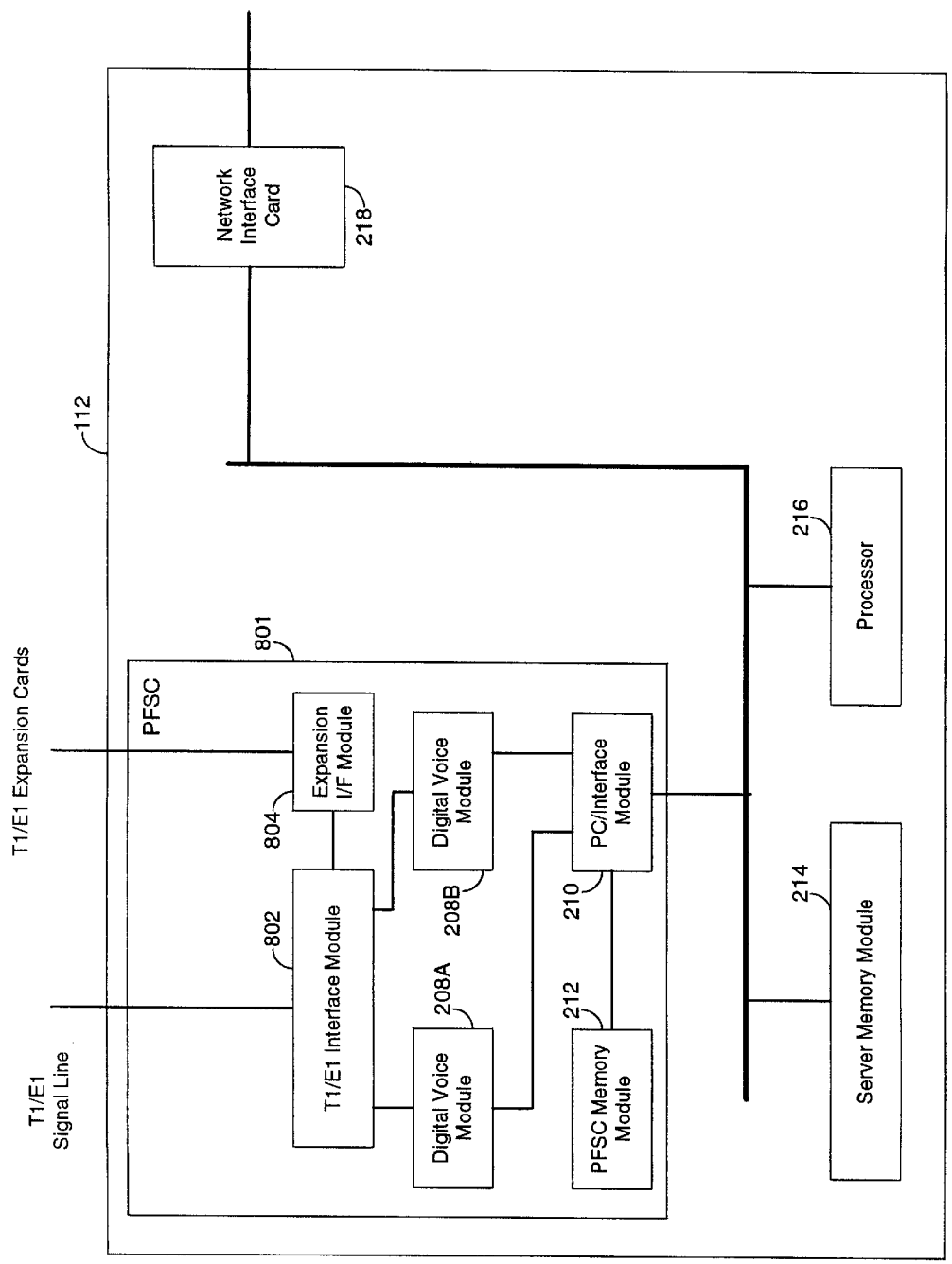
FIG. 8 is a more detailed illustration of a PC/file server and a phone/fax server card having a digital telephony interface according to an alternate embodiment of the present invention.

FIG. 8 is a more detailed illustration of a file server 112 and a phone/fax server card 801 having a digital telephony interface according to the preferred embodiment of the present invention. The server includes a NIC 218, a processor 216, and a server memory module 214, that are described in detail above. The digital PFSC 801 includes two DVMs 208, a PC/interface module 210 and a PFSC memory module 212, that are described above. The digital PFSC 801 includes a T1/E1 interface module that receives digitized aural signals on a T1/E1 signal line. The T1/E1 interface module 802 multiplexes the signal from up to twenty-four DVMs 208 on a single T1 line or up to thirty DVMs 208 on a single E1 line. One embodiment of the present invention includes four DVMs on the T1/E1 interface card 801 and connects through expansion interface module 804 to T1/E1 channel expansion cards, each having an additional four DVMs. The T1/E1 interface module 802 provide higher density connection capabilities for the phone/fax server implementation.

While the present invention has been particularly shown and described with reference to a preferred embodiment, and several alternate embodiments, it will be understood by persons skilled in the relevant art that various changes in form and details can be made therein without departing from the spirit and scope of the invention.

What is claimed is:

1. A method for preparing an aural signal for transport across a network, comprising the steps of:

converting an aural signal into a data signal;

framing the data signal into plural packets;

providing forward error correction information in addition to the data signal in each of the packets, the forward error correction information for a given one of the packets comprising partial aural data corresponding to a previously transmitted one of the packets; and sequencing the packets for transmission across a network.

2. The method of claim 1, wherein the aural signal comprises a voice signal; and wherein said converting step includes the steps of:
digitizing the voice signal; and
compressing the digitized voice signal into the data signal using linear predictive coding.

3. The method of claim 2, wherein the partial aural data comprises at least one of frame-to-frame predictive information and pitch information for at least one frame of the data signal present in the previously transmitted packet.

4. The method of claim 3, wherein the linear predictive coding includes ITU G.729 recommendation linear predictive coding.

5. A method for transporting an aural signal across a network, comprising the steps of:

the method of claim 1;

receiving the given packet; and creating an approximation of at least one frame of the data signal present in the previously transmitted packet using the partial aural data of the forward error correction information of the received given packet.

6. The method of claim 5, further comprising the step of substantially reconstructing the aural signal using the received given packet and the created approximation of the least one frame of the data signal.

7. The method of claim 1, wherein the network comprises at least one of a local area network and a wide area network.

8. A method for transporting an aural signal across a packet-based network, comprising the steps of:

converting an aural signal into aural data;

framing the aural data into at least first and second packets;

providing forward error correction information in addition to the aural data in the at least first and second packets, the forward error correction information for the second packet comprising partial aural data corresponding to the first packet; and sequentially transmitting the at least first and second packets across a packet-based network.

9. The method of claim 8, wherein the aural signal comprises a voice signal; and wherein said converting step includes the steps of:
digitizing the voice signal; and
compressing the digitized voice signal into the aural data using linear predictive coding.

10. The method of claim 9, wherein the partial aural data comprises at least one of frame-to-frame predictive information and pitch information for at least one frame of the aural data present in the first packet.

11. The method of claim 9, wherein the linear predictive coding includes ITU G.729 recommendation linear predictive coding.

12. The method of claim 8, further comprises the steps of:

receiving the second packet; and recreating an approximation of at least one frame of the data signal present in the first packet using the partial aural data of the forward error correction information of the received second packet.

13. The method of claim 12, further comprising the step of substantially reconstructing the aural signal using the second packet and the created approximation of the least one frame of the data signal.

14. The method of claim 8, wherein the packet-based network comprises at least one of a local area network and a wide area network.

15. A system for preparing a voice signal for transmission across a packet-based network, comprising:

a voice unit for converting a voice signal into a data signal;

a framer coupled to said voice unit for framing the data signal into at least first and second packets; and a voice enhancement unit coupled to said framer for providing forward error correction information in addition to the data signal in each of the packets, the forward error correction information for the second packet comprising partial aural data corresponding to the first packet.

16. The system of claim 15, further comprising a receiver for receiving the voice signal.

17. The system of claim 15, further comprising a transmitter coupled to said framer and said voice enhancement unit for sequentially transmitting the at least first and second packets across a packet-based network.

18. The system of claim 15, wherein said voice unit digitizes the voice signal and compresses the digitized voice signal into the data signal using linear predictive coding.

19. The system of claim 18, wherein the partial aural data comprises at least one of frame-to-frame predictive information and pitch information for at least one frame of the data signal present in the first packet.

20. The system of claim 19, wherein the linear predictive coding includes ITU G.729 recommendation linear predictive coding.

21. A system for transporting a voice signal across a packet-based network, comprising:

the system of claim 17;

means for receiving the second packet from the packet-based network; and means for creating an approximation of at least one frame of the data signal present in the first packet using the partial aural data of the forward error correction information of the received second packet.

22. The system of claim 21, further comprising means for substantially reconstructing the aural signal using the received second packet and the created approximation of the least one frame of the data signal.

23. The system of claim 21, wherein the packet-based network comprises at least one of a local area network and a wide area network.

24. A data signal for bearing aural information across a packet-based network, the data signal being accessible by one or more nodes coupled to the packet-based network, the data signal comprising:

at least one frame of data representing aural information; and forward error correction information in addition to the at least one frame of data comprising partial aural data corresponding to a previously transmitted data signal, the forward error correction information useable by at least one of the nodes to create a frame corresponding to the previously transmitted data signal.

25. The data signal of claim 24, wherein the aural information comprises voice; and wherein said frame comprises a digitized portion of the voice compressed using linear predictive coding.

26. The data signal of claim 25, wherein the partial aural data comprises at least one of frame-to-frame predictive information and pitch information for at least one frame of the previously transmitted data signal.

27. The data signal of claim 26, wherein the linear predictive coding includes ITU G.729 recommendation linear predictive coding.

28. The method of claim 1, further comprising adjusting rate of transmission of the packets across the network in response to a traffic condition of the network.

29. The method of claim 28, further comprising eliminating a portion of the data signal in each packet to reduce the rate of transmission.

30. The method of claim 1, further comprising adding a time stamp to each packet.

31. The method of claim 30, further comprising determining if the packet is late based on the time stamp.

32. A method of transporting an aural signal across a data network, comprising:

receiving packets containing corresponding digitized data representing the aural signal, each packet further comprising forward error correction information including partial aural data corresponding to a previously transmitted one of the packets;

determining if a given packet is late or lost; and recreating the aural signal corresponding to the late or lost packet using the partial aural data of the forward error correction information contained in a subsequent packet.

33. The method of claim 32, wherein determining if the given packet is late or lost is based on time stamps contained in the packets.

34. The method of claim 32, wherein determining if the given packet is late or lost is based on whether contents of a jitter buffer up to the lost packet have been used.

35. The method of claim 34, further comprising varying a size of the jitter buffer based on measured network delay.

36. The method of claim 34, further comprising discarding the given packet if the given packet later arrives.

* * * * *

UNITED STATES PATENT AND TRADEMARK OFFICE
CERTIFICATE OF CORRECTION

PATENT NO. : 6,298,057 B1  
DATED : October 2, 2001  
INVENTOR(S) : Kenneth R. Guy, Jaswant R. Jain, Ishwar V. Jasuja, Michael W. Johnson, Albert Juandy, Simon S. Lam, Anthony Y. Lee, David Misunas, Jacques A. Roth It is certified that error appears in the above-identified patent and that said Letters Patent is hereby corrected as shown below:

<u>Title page,</u>  
Line 1, "RELIABILITY" should be -- RELIABLY --.

Signed and Sealed this

Twenty-sixth Day of March, 2002

*Attest:*

*Attesting Officer*

JAMES E. ROGAN  
*Director of the United States Patent and Trademark Office*